UNITED STATES PATENT OFFICE.

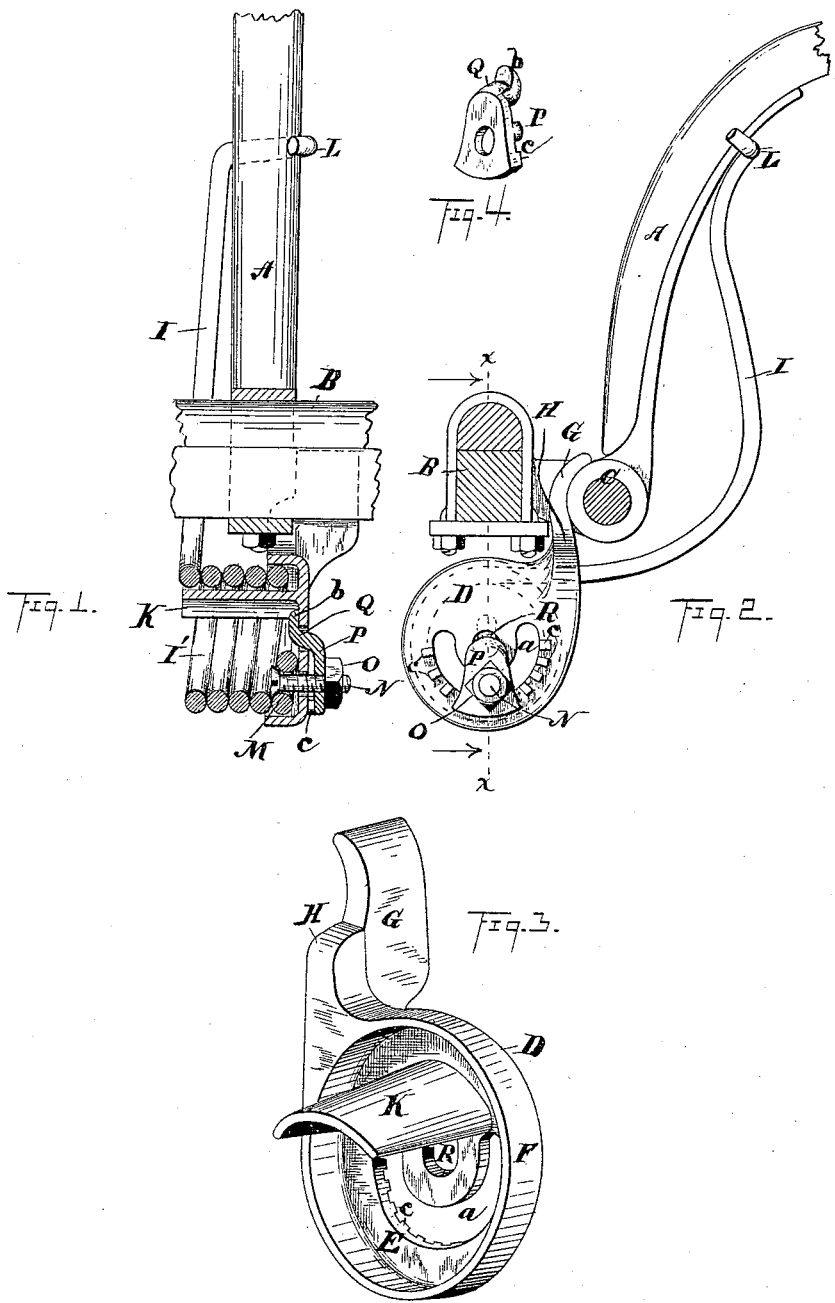

CHARLES BISHOP, OF CLEVELAND, AND OLIVER D. MILLER, OF BROOKLYN, OHIO.

COMBINED SHAFT-SUPPORT AND ANTI-RATTLER.

SPECIFICATION forming part of Letters Patent No. 459,956, dated September 22, 1891.

Application filed June 15, 1891. Serial No. 396,298. (No model.)

*To all whom it may concern:*

Be it known that we, CHARLES BISHOP, of Cleveland, and OLIVER D. MILLER, of Brooklyn, Cuyahoga county, and State of Ohio, both citizens of the United States, have invented a certain Improved Carriage-Shaft Supporter and Anti-Rattler, of which the following is a full and complete description thereof.

The nature of said invention relates to the devices employed for the purpose of adjusting and retaining the tension and position of the spring in relation to the shaft. It also embraces means for arresting the rattling of the clip and thill-coupling.

That the invention may be fully seen and understood by others, reference will be had to the following specification and annexed drawings, forming part thereof.

Figure 1 is a rear view, partly in section, in direction of the line $x\ x$, Fig. 2. Fig. 2 is a side view. Fig. 3 is a perspective view of the bracket detached. Fig. 4 is a perspective view of the pivotal washer detached.

Like letters of reference designate like parts in the drawings and specification.

In the drawings, A, Figs. 1 and 2, represents the carriage-shaft, B the clip, and C, Fig. 2, coupling-joint of the axle and shaft, which may be essentially of the ordinary construction.

The bracket D, Figs. 2 and 3, is formed with a recess or chamber E, circumscribed by the rim or wall F, extending from which is an arm G, which arm is curved to accord with the shaft-coupling C, as shown in Fig. 2. On the side of the said arm is a shoulder H. By means of the curved arm and shoulder H the bracket retains its position when in place, as the curve of the arm and the shoulder is in contact with the coupling-joint and coupling-brace H, respectively—that is, the shoulder is in contact with the brace on the under side and the arm G is in contact with the face of the coupling-joint C—as shown, which prevents the bracket D from raising up or down or moving out of place, as the tension of the spring I, attached to the bracket, holds it in the position required for practical use, (indicated in Fig. 2,) with the spring extending from the bracket to the shaft A.

Extending from the recess or chamber of the bracket is a curved arm K, Fig. 3, which forms an integral part of the bracket. The curve or arc of the arm coincides with the spiral spring I, which is within the entire width of the coil I' of the spring, as seen in Fig. 1. By means of this arm the spring is supported and aids in the retention of the spring's resiliency. The outer terminal L of the spring laps under the shaft and supports it, as indicated in Figs. 1 and 2, and is provided with means to allow the nuts of the shaft to pass easily over the spring. At the interior end of the spring is formed an eye at M, through which passes the screw-bolt N, with the head thereof on the eye M and the nut O on the outside of the pivotal washer P, Figs. 1, 2, and 4. The pivotal end Q is inserted in the pivot-hole R of the bracket, Figs. 2 and 3. This pivotal connection of the washer admits of its being turned in either direction in the line of the slot $a$. At the same time the bolt is moved accordingly in the said slot, by which means more or less tension may be given to the spring, as it is connected with the washer by means of the screw-bolt, as shown. To prevent the pivot Q of the washer from moving out of the pivot-hole R, a lip $b$ forms a retainer at the end of the pivot Q and laps on the inside of the bracket, Figs. 1 and 4. To increase or reduce the tension of the spring I the nut O is relaxed on the bolt, so that the washer may be turned on its pivotal center, which is in the hole R, and is held at the point required from slipping by means of the teeth $c$ or their equivalent on the washer and bracket, which arrest the turning or moving of the washer in the line of the slot $a$ by the action of the spring until the washer is screwed down upon the bracket by means of the bolt and nut to hold the parts in place, as above described. The tension or force of the spring for holding up the shafts is also exerted in preventing the coupling-joint C from rattling, as the force of the spring causes the arm G to be constantly pressed against the coupling-joint, as shown in Fig. 2.

The main and distinguishing features of this invention relate to the described pivot-washer and screw-bolt in their relation to the bracket and shaft for adjusting and holding the tension of the spring in relation to the shaft and coupling-joint by relaxing the nut upon the bolt N, so that the washer may be moved from the teeth and in the line of the curved slot when detached from the vehicle. By this means more or less force may be given to the spring I, as stated, on moving the pivotal washer in the line of the said slot, at the same time the axis of the washer is held in the pivot-hole R, as described.

What we claim, and desire to secure by Letters Patent, is—

1. The pivotal washer P, having its axis in the side of the bracket concentric to the segmental slot $a$, provided with teeth for engagement with the teeth of the bracket, in combination with the spring I, screw-bolt, and nut, connected with the bracket, substantially as and for the purpose set forth.

2. In a vehicle-shaft supporter, the pivotal washer having its axis or pivot concentric with the segmental slot $a$, in combination with the bracket and spring, with means for securing the coiled terminal of said spring to the said washer and the other terminal of the spring extending out in support of said shaft, substantially as described.

In testimony whereof we affix our signatures in presence of two witnesses.

CHARLES BISHOP.
OLIVER D. MILLER.

Witnesses:
W. H. BURRIDGE,
JNO. F. VANDERCOOK.